United States Patent
Maiuzzo (10) Patent No.: US 8,005,452 B2
(45) Date of Patent: Aug. 23, 2011

(54) DIGITAL COMB LIMITER COMBINER

(75) Inventor: Michael A. Maiuzzo, Queenstown, MD (US)

(73) Assignee: Sentel Corporation, Alexandria, VA (US)

( * ) Notice: Subject to any disclaimer, the term of this patent is extended or adjusted under 35 U.S.C. 154(b) by 777 days.

(21) Appl. No.: 12/116,606

(22) Filed: May 7, 2008

(65) Prior Publication Data
US 2009/0042524 A1 Feb. 12, 2009

Related U.S. Application Data

(60) Provisional application No. 60/916,868, filed on May 9, 2007, provisional application No. 60/916,867, filed on May 9, 2007, provisional application No. 60/917,205, filed on May 10, 2007, provisional application No. 60/917,203, filed on May 10, 2007.

(51) Int. Cl.
*H04B 1/10* (2006.01)

(52) U.S. Cl. .................. 455/306; 455/307; 455/308

(58) Field of Classification Search .................. 455/280, 455/283, 293, 296, 303, 305, 306, 307, 308, 455/311; 375/346, 350
See application file for complete search history.

(56) References Cited

U.S. PATENT DOCUMENTS

6,549,560 B1 * 4/2003 Maiuzzo et al. .............. 375/136
* cited by examiner

*Primary Examiner* — Nguyen Vo
(74) *Attorney, Agent, or Firm* — The Marbury Law Group, PLLC (57) ABSTRACT

A wideband receiver comprises a comb limiter combiner wherein the limiting is conducted by digitization and frequency excision in the frequency domain. The received signal is divided up into sub-bands by a bank of bandpass filters having contiguous pass bands spanning the entire receiver range. In each sub-band the band limited signal is digitized and subjected to digital signal processing. A threshold is set such that any frequency with a magnitude that exceeds the threshold is excised in the frequency domain. When converted back to the time domain, the high-power interference frequencies will no longer be present, thereby leaving only the low-power noise and the desired signal.

36 Claims, 6 Drawing Sheets

DIGITAL COMB LIMITER COMBINER

CROSS REFERENCE TO RELATED APPLICATIONS

This application claims the benefit of Provisional Application No. 60/916,868 filed May 9, 2007, Provisional Application No. 60/916,867 filed May 9, 2007, Provisional Application No. 60/917,205 filed May 10, 2007 and Provisional Application No. 60/917,203 filed May 10, 2007'. The 60/916,868, 60/916,867, 60/917,205 and the 60/917,203 applications are incorporated by reference herein, in their entireties, for all purposes.

BACKGROUND AND SUMMARY

A signal intelligence receiver intercepts radio signals at a high sensitivity across a large bandwidth of the radio spectrum. This ability to intercept radio signals may be compromised by noise sources that effectively reduce the physical range from which the signal intelligence receiver can pick signals of interest from their origins. Frequency-hopping, frequency-scanning wideband and ultra-wideband communications receivers cannot employ simple passive narrowband preselector filters to protect amplifiers and limiters in receiver front ends from strong interference outside the communications signal bandwidth. Close proximity to multiple transmitters reduces the effective communications range of such receivers to almost zero.

This range reduction has been shown to be due to intermodulation products in the front end of the receiver. Diodes near the receiver's antenna port used for power limiting or circuit switching act as mixers. The resulting intermodulation products affect virtually every communications channel in the receiver's range.

Thus, a continued need exists for front end filtering for wide-bandwidth receivers.

One scheme proposed in the past for enabling detection of weak signals in the presence of strong interference has been to clip the strong signals to remove a portion of the interfering signals' energy. This has shown some improvement, yet this approach leaves much of the interfering signal energy present for the radio receiver to attempt to differentiate from the desired signal.

Thus, a continued need exists for a way to remove the signal power of strong narrow-band interfering signals.

Low-powered signals are recovered in the presence of high-powered interference in close spectral proximity through frequency excision. The interfering signals have a much higher power than the desired "threat" signals. This higher power of the narrow-band interfering signals shows up in the frequency domain as a much greater magnitude than the threat signals. A threshold is set in a receiver such that any frequency with a magnitude that exceeds the threshold is excised in the frequency domain. When converted back to the time domain, the high-power interference frequencies will no longer be present, thereby leaving only the low-power noise and the desired signal.

In an embodiment, a digital comb limiter combiner comprises an antenna, an input coupler, a plurality of sub-band processing paths, and an output coupler. The antenna receives an analog signal that is sent to the input coupler. Each of the plurality of sub-band signal processing paths receives the analog signal from the coupler. In this embodiment, each sub-band processing path comprises an input bandpass filter connected to the input coupler, an analog to digital converter (A/D) connected to the input bandpass filter, a digital signal processor (DSP) connected to the A/D, a digital to analog converter (D/A) connected to the DSP, an amplifier connected to the D/A and an output bandpass filter connected to the amplifier. The output of each of the output bandpass filters is then connected to the output coupler.

The input bandpass filter selects a sub-band of the analog signal and provides this sub-band signal to the A/D. The A/D converts the analog sub-band signal to a digital sub-band signal. The DSP comprises an excision threshold and instructions to convert the digital sub-band signal from a time domain to a frequency domain, instructions to excise signal components of the digital sub-band signal at frequencies at which a digital sub-band signal amplitude exceeds the excision threshold thereby producing a processed digital sub-band signal, and instructions to convert the processed digital sub-band signal from the frequency domain to the time domain. The D/A converts the processed digital sub-band signal to a processed analog sub-band signal. The bandpass filter connected to the amplifier filters intermodulation products from the processed analog sub-band signal. The output coupler connected to the output bandpass filter of each of the plurality of sub-band signal processing paths receives the processed analog sub-band signal from each of the plurality of sub-band signal processing paths and combines the processed analog sub-band signal from each of the plurality of sub-band signal processing paths into a composite signal.

In an embodiment, the input bandpass filter is cryogenically cooled. In another embodiment, the out put bandpass filter is cryogenically cooled.

In yet another embodiment, the input bandpass filters of the plurality of sub-band signal processing paths have pass bands that are contiguous with one another across the entirety of a nominal bandwidth for the digital comb limiter combiner. In another embodiment, the input bandpass filter pass band and the output bandpass filter pass bands are substantially the same.

In still another embodiment, the output of the D/A is sent directly to output coupler and the output bandpass filter and the amplifier are not used.

In an embodiment, the excision threshold used by the DSP in a sub-band signal processing path is adjustable independent of an excision threshold used by a DSP in another sub-band signal processing path. In yet another embodiment, the DSP in a sub-band signal processing path transforms from the time domain into the frequency domain and from the frequency domain into the time domain independent of a DSP in another sub-band signal processing path. In another embodiment, the DSP in a sub-band signal processing path utilizes a sample size that is independent of a sample size used by a DSP in another sub-band signal processing path.

In an embodiment, the gain used by the amplifier in a sub-band signal processing path is adjustable independent of a gain used by a DSP in another sub-band signal processing path.

In another embodiment, each sub-band signal processing path further comprises a notch filter interposed between the input bandpass filter and the A/D. In an embodiment, the notch filter is self-tuning and the self-tuning notch filter is tuned based upon a tune word provided by a co-site transmitter. In yet another embodiment, the notch filter comprises a cryogenically cooled high temperature superconductor notch filter.

DETAILED DESCRIPTION

The comb filter banks at the input and output of the receiver divide the waveforms into different frequency sub-bands. Each comb limiter combiner (CLIC) sub-band is substantially narrower than 50 MHz, for example about 5 MHz wide. Within each sub-band, the high-power interference is processed to reduce levels to the spurious-free dynamic range of signal intelligence and electronic intelligence (SIGINT/ELINT) receivers. The CLIC accomplishes this without generating significant intermodulation products.

By digitizing the signal within each of the sub-bands, digital signal processing technology can be brought to bear on the signal. In particular, strong interfering signals in close proximity in the frequency spectrum to a signal of interest can be dealt with using frequency excision. By this technique the bulk of the energy of the strong interfering signal is removed while leaving undisturbed a substantial amount of the energy of the signal of interest.

The embodiments described herein utilize digital signal processing. If a receiver with a wideband RF stage is located near other electronic radiators such that their neighbors' signal levels exceed the spurious-free dynamic range of the receiver's A/D converter, spurious signals can be created in many additional channels, making those channels unusable for reception by the receiver. A/D converters are in a general sense physically limited in the maximum output bit rate. The output bit rate of the A/D is the product of (1) the A/D sample rate and (2) the number of bits used to represent each sample. The former has to be high enough to support the bandwidth of the signal being sampled. The latter has to be high enough to provide a sufficient spurious-free dynamic range. Because their product is essentially limited, they are inversely proportional. CLIC limits the bandwidth of the sampled signal which enables a higher spurious-free dynamic range without sacrificing the sampled signal bandwidth.

Figure 1:
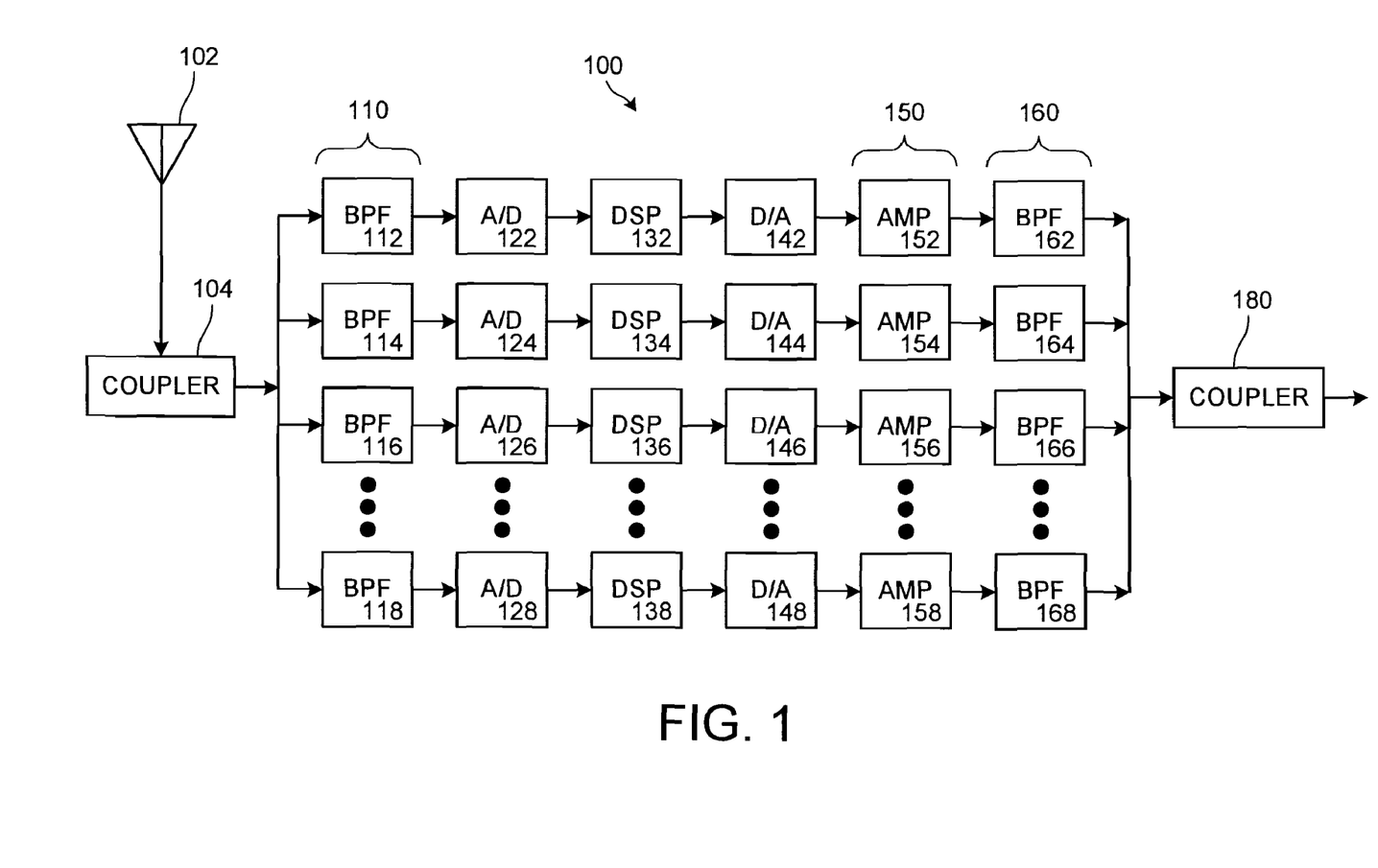
FIG. 1 illustrates a block diagram of a digital comb limiter combiner according to an embodiment.

Referring to FIG. 1, a block diagram of a digital comb limiter combiner 100 according to one embodiment is illustrated. Radio frequency signals are picked up by an antenna 102. The antenna 102 (for example, a communications signal antenna) is connected to an input signal coupler 104. The input signal coupler 104 (for example, a power splitter/combiner) distributes the antenna signal to a parallel bank of bandpass filters 110. Optionally, the signals may be amplified using a low noise amplifier (LNA, not shown) to boost their amplitude prior to being fed into the input signal coupler 104.

Each input bandpass filter 112, 114, 116, 118 is connected to a corresponding analog-to-digital converter (A/D) 122, 124, 126, 128. The A/D's 122, 124, 126, 128 are each connected to a corresponding digital signal processor (DSP) 132, 134, 136, 138. The DSP's 132, 134, 136, 138 are each connected to a corresponding digital-to-analog converter (D/A) 142, 144, 146, 148. The D/A's 142, 144, 146, 148 are each connected to a corresponding amplifier circuit 152, 154, 156, 158. The amplifiers 152, 154, 156, 158 are each connected to a corresponding output bandpass filter 162, 164, 166, 168. The bank of output bandpass filters 160 is connected to output signal coupler 180. The output signal coupler 180 (for example, a linear power splitter/combiner) is connected to a communications receiver front end, such as a digital communications receiver (not shown).

In operation, each filter in the input bandpass filter bank 110 spans a portion of a wideband or ultra-wideband receiver bandwidth. A receiver communications signal is coupled to the filters 112, 114, 116, 118 from the antenna 102 through the input signal coupler 104. The center frequencies and pass bands of the input bandpass filters 112, 114, 116, 118 are selected as sub-bands to match the channel separation of the communications signal and, when known a priori, the frequency separation of strong interfering signals. In an embodiment, the pass bands of input bandpass filters 112, 114, 116, 118 overlap at or near the −3 dB points, thus providing continuous coverage of a segment of bandwidth.

In an embodiment, output bandpass filters 162, 164, 166, 168 have the same center frequency, bandwidth, and frequency roll-off as the respective corresponding input bandpass filters 112, 114, 116, 118 to prevent out-of-band intermodulation products generated by any induced non-linearities in the sub-band's components from being input to the receiver front end.

The DSP's 132, 134, 136, 138 operate independently of one another. A particular DSP performs Fast Fourier Transform (FFT) and Inverse Fast Fourier Transform (IFFT) calculations independently of calculations performed by other DSPs and is capable of independently choosing how many samples (for example, all, ½, or ¼ would be common choices) should be used in its FFT and IFFT calculations. A particular DSP is capable of independently setting its excision threshold to be different from that of other DSP's in the other sub-bands. This enables custom handling of scenarios of differing magnitudes of desired signals in different sub-bands. For example, if in one sub-band the desired signal is unusually strong, the excision threshold for that sub-band alone is adjusted upward to avoid the undesirable result of excising some (or all) of the desired signal's spectrum. By making this adjustment in only one sub-band the other sub-bands keep their lower excision thresholds so as to avoid failure to excise interfering signals in those sub-bands.

The A/D's 122, 124, 126, 128 operate independently of one another and may operate at different sampling rates and quantization levels. The D/A's 142, 144, 146, 148 operate in coordination with A/D's 122, 124, 126, 128 in their respective sub-band to the extent that any changes in dynamic range or quantization level by a given A/D must be followed by its respective D/A. Although it is preferred to change the effective sample rate by letting the DSP choose how many samples to transform, it is optionally possible to adjust the sample rate of an A/D converter. If the A/D sampling rate is adjusted, the operation rate of the respective DSP is also adjusted. Choice of sampling rate, or choice of how many samples to use in the transform, are determined based on separation (or lack thereof) between the interfering signal and the signal of interest.

In an embodiment, the amplifiers have adjustable gain. The gain may be adjusted uniformly for the whole bank of amplifiers or the gain of a subset of the sub-bands may be adjusted independently of others. As one example, a sub-band has its amplifier use a higher gain to bring out a particularly weak signal-of-interest (SOI). As another example, a sub-band has its amplifier use a lower gain to avoid saturation clipping for a particularly strong SOI.

While FIG. 1 illustrates the digital comb limiter combiner 100 as a series of discrete elements, this is not meant as a limitation. The functions of two or more elements may be performed by a single element. By way of illustration and not as a limitation, the functions attributed to an A/D converter, a digital signal processor (DSP), and a D/A converter may be combined into a single component such as an ASIC chip. Other elements illustrated in FIG. 1 may be similarly combined.

When one or more interfering signals occur in the bandpass of a single input bandpass filter 112, the corresponding DSP 132 identifies what frequency range (or ranges) over which the interference exceeds an amplitude threshold T and then excises those frequencies. Upon transformation back into the time domain by the D/A 142 the resulting frequency excised signal may be slightly degraded by the addition of some out-of-band products as the result of nonlinear effects caused by the DSP 132 and/or the D/A 142. However, the degradation will be confined to the time periods when the interfering signal frequencies occur in the pass band of the same input bandpass filter 112 passing the desired signal. Additionally, the out-of-band products are mitigated by the filtering provided by the corresponding output bandpass filter 162.

The digital comb limiter combiner of this embodiment is illustrated with four distinct sub-band signal processing paths. However, this is not meant as a limitation. The number of sub-band signal processing paths may be less or more than this number.

The comb limiter combiner according to this embodiment may be designed for virtually any frequency band. The input and output signal couplers 104, 180 may utilize a multiport input. Additionally, any incurred losses from couplers 104, 180 are compensated by selecting the gain of the amplifier bank 150.

According to an embodiment, a digital comb limiter combiner utilizes banks of input and output band pass filters 110, 160 that are cryogenically cooled high temperature superconductor bandpass filters. Details of such an optional implementation in an analog system are explained in detail in co-pending utility application Ser. No. 12/042,124, filed Mar. 4, 2008, which is incorporated by reference herein, for all purposes.

Figure 2:
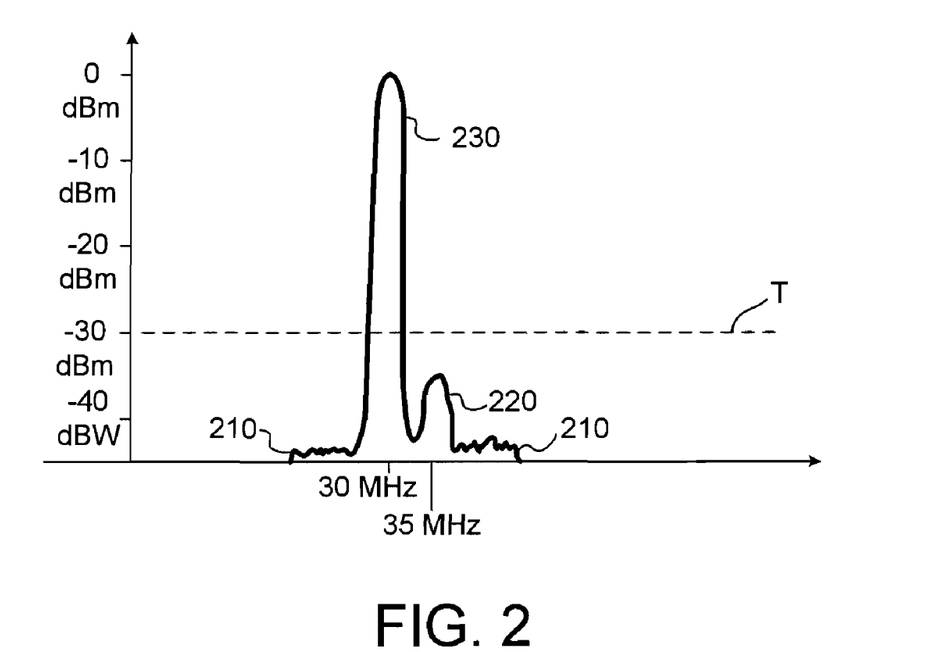
FIG. 2 illustrates a frequency domain representation of signals present in a CLIC sub-band prior to DSP frequency excision according to the embodiment of FIG. 1.

Referring to FIG. 2, a frequency domain representation illustrates signals present in a CLIC sub-band prior to frequency excision by the DSP. The band limited noise floor 210 reflects that the signal has passed through one of the input bandpass filters 110. The SOI 220 has a small amplitude that is well below the threshold T and is dwarfed in size by the amplitude of an adjacent interfering signal 230. The SOI 220 may be, for example, a threat signal to be processed for intelligence value. The interfering signal 230 may be, for example, co-site interference produced by a transmitter whose antenna is co-located with the receiving antenna 102, or as another example, a jamming signal produced by a hostile source. The interfering signal 230 exceeds the threshold T.

Figure 3:
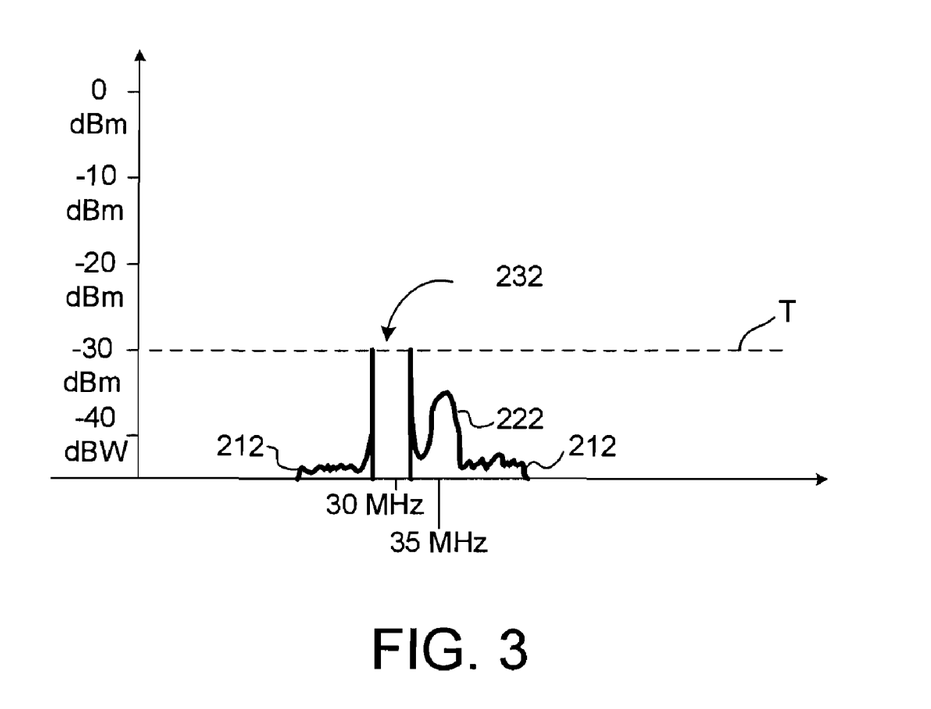
FIG. 3 illustrates a frequency domain representation of signals present in a CLIC sub-band after DSP frequency excision according to the embodiment of FIG. 1.

Referring to FIG. 3, a frequency domain representation illustrates signals present in a CLIC sub-band after frequency excision by the DSP. The signals falling within the frequency range having an amplitude exceeding the threshold T have been excised, leaving a blank spot 232 in the spectrum where the excised spectral signature had previously been. The SOI 222 remains substantially unscathed, with the exception of some small portion that may have coincided with the excised band of frequencies. The noise floor 212 remains substantially unchanged except for the addition of any Gaussian noise that is added as a result of passing the signal passes through the DSP circuitry.

The embodiment as illustrated in FIG. 2 and FIG. 3 corresponds to structure analogous to that of FIG. 1, which is implemented such that one of the sub-bands encompasses the range of 30-35 MHz. The desired low-powered "threat" signal is centered at 35 MHz, the high-powered (70 dB greater than desired) interference signal is centered at 30 MHz, and the received signal includes Gaussian noise. After bandpass filtering into the sub-band, the A/D converter clips signal excursions of a magnitude that exceeds −30 dBm. The DSP conducts an FFT on the digitized signal to convert the digitized signal into the frequency domain. Those portions of the frequency domain signal that exceed the threshold T are excised. The DSP then conducts an IFFT to convert the excised signal back into the time domain. A delay block is used to adjust for any filter delays. The CLIC output bandpass filter has a center frequency and bandwidth corresponding to that of the corresponding input bandpass filter.

The desired signal is successfully extracted from the interference and noise even in situations where there is a significant amount of clipping through the A/D converter since the saturation level of the A/D converter exceeds that of the excision threshold.

How far apart the interfering and desired signals are affects the selection of how many samples should be used in the FFT calculations. That is, the frequency separation of the interfering and desired signals affects selection of the sampling frequency (either actual or effective).

Although the DSP does not remove all of the signal energy attributable to the interfering signal 230, removal of a significant portion of the interfering signal 230 by the CLIC makes it possible for the receiver to detect the SOI 222 with a much reduced bit error rate. Because the threshold T is adjustable, the amount of spectrum excised could be increased by lowering the threshold T. Adjustment to T is made so as to avoid, as much as reasonable, the unintentional excising of the SOI 222.

Figure 4:
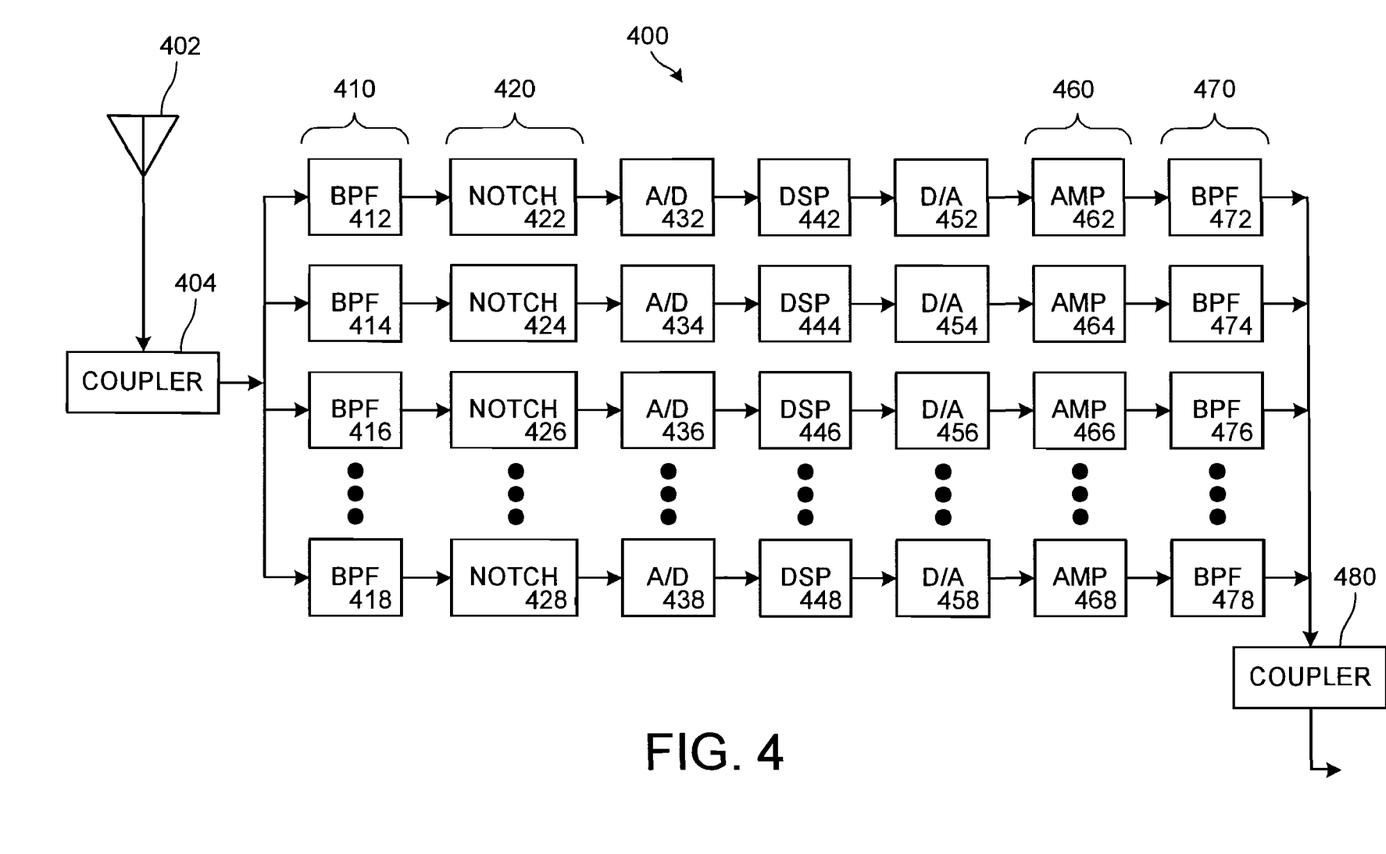
FIG. 4 illustrates a block diagram of a digital comb limiter combiner according to another embodiment.

Referring to FIG. 4, a block diagram of a digital comb limiter combiner 400 according to another embodiment is illustrated. Radio frequency signals are picked up by an antenna 402. The antenna 402 (for example, a communications signal antenna) is connected to an input signal coupler 404. The input signal coupler 404 (for example, a power splitter/combiner) distributes the antenna signal to a parallel bank of bandpass filters 410. Optionally, the signals may be amplified using a low noise amplifier (LNA, not shown) to boost their amplitude prior to being fed into the input signal coupler 404. The bank 410 of bandpass filters feeds into a bank of notch filters 420 so that each input bandpass filter 412, 414, 416, 418 is connected to a corresponding notch filter 422, 424, 426, 428. Each of the notch filters 422, 424, 426, 428 is connected to a corresponding analog-to-digital converter (A/D) 432, 434, 436, 438. The A/D's 432, 434, 436, 438 are each connected to a corresponding digital signal processor (DSP) 442, 444, 446, 448. The DSP's 442, 444, 446, 448 are each connected to a corresponding digital-to-analog converter (D/A) 452, 454, 456, 458. The D/A's 452, 454, 456, 458 are each connected to a corresponding amplifier circuit 462, 464, 466, 468 of an amplifier bank 460. The amplifiers 462, 464, 466, 468 are each connected to a corresponding output bandpass filter 472, 474, 476, 478. The bank of output bandpass filters 470 is connected to output signal coupler 480. The output signal coupler 480 (for example, a linear power splitter/combiner) is connected to a communications receiver front end, such as a digital communications receiver (not shown).

In operation, each filter in the input bandpass filter bank 410 spans a portion of a wideband or ultra-wideband receiver bandwidth. A receiver communications signal is coupled to the filters 412, 414, 416, 418 from the antenna 402 through the input signal coupler 404. The center frequencies and pass bands of the input bandpass filters 412, 414, 416, 418 are selected as sub-bands to match the channel separation of the communications signal and, when known a priori, the frequency separation of strong interfering signals. In an embodiment, the pass bands of input bandpass filters 412, 414, 416, 418 overlap at or near the −3 dB points, thereby providing continuous coverage of a segment of bandwidth.

In an embodiment, output bandpass filters 472, 474, 476, 478 typically have the same center frequency, bandwidth, and frequency roll-off as the respective corresponding input bandpass filters 412, 414, 416, 418 to prevent out-of-band intermodulation products generated by any induced non-linearities in the sub-band's components from being input to the receiver front end.

The DSP's 442, 444, 446, 448 operate independently of one another. A particular DSP performs Fast Fourier Transform (FFT) and Inverse Fast Fourier Transform (IFFT) calculations independently of calculations performed by other DSP's and is capable of independently choosing how many samples (for example, all, ½, or ¼ would be common choices) should be used in its FFT and IFFT calculations. A particular DSP is capable of independently setting its excision threshold to be different from that of other DSP's in the other sub-bands. This enables custom handling of scenarios of differing magnitudes of desired signals in different sub-bands. For example, if in one sub-band the desired signal is unusually strong, the excision threshold for that sub-band alone is adjusted upward to avoid the undesirable result of excising some (or all) of the desired signal's spectrum. By making this adjustment in only one sub-band the other sub-bands keep their lower excision thresholds so as to avoid failure to excise interfering signals in those sub-bands.

The A/D's 432, 434, 436, 438 operate independently of one another and may operate at different sampling rates and quantization levels. The D/A's 452, 454, 456, 458 operate in coordination with A/D's 432, 434, 436, 438 in their respective sub-band to the extent that any changes in dynamic range or quantization level by a given A/D must be followed by its respective D/A. Although it is preferred to change the effective sample rate by letting the DSP choose how many samples to transform, it is optionally possible to adjust the sample rate of an A/D converter. Choice of sampling rate, or choice of how many samples to use in the transform, may be determined based on separation (or lack thereof) between the interfering signal and the signal of interest.

In an embodiment, the amplifiers have adjustable gain. The gain may be adjusted uniformly for the whole bank of amplifiers or the gain of a subset of the sub-bands may be adjusted independently of others. As one example, a sub-band has its amplifier use a higher gain to bring out a particularly weak signal-of-interest (SOI). As another example, a sub-band has its amplifier use a lower gain to avoid saturation clipping for a particularly strong SOI.

When one or more interfering signals occur in the bandpass of a single input bandpass filter 412, the corresponding DSP 442 identifies what frequency range (or ranges) over which the interference exceeds an amplitude threshold T and then excises those frequencies. Upon transformation back into the time domain by the D/A 452 the resulting frequency excised signal may be slightly degraded by the addition of some out-of-band products as the result of nonlinear effects caused by the DSP 442 and/or the D/A 452. However, the degradation will be confined to the time periods when the interfering signal frequencies occur in the pass band of the same input bandpass filter 412 passing the desired signal. Additionally, the out-of-band products are mitigated by the filtering provided by the corresponding output bandpass filter 472.

The digital comb limiter combiner of this embodiment is illustrated with four distinct sub-band signal processing paths. However, this is not meant as a limitation. The number of sub-band signal processing paths may be less or more than this number.

The comb limiter combiner according to this embodiment may be designed for virtually any frequency band. The input and output signal couplers 404, 480 may utilize a multiport input. Additionally, any incurred losses from couplers 404 and 480 are compensated by selecting the gain of the amplifier bank 460.

According to an embodiment, a digital comb limiter combiner utilizes banks of input and output band pass filters 410, 470 that are cryogenically cooled high temperature superconductor bandpass filters. Details of such an optional implementation in an analog system are explained in detail in co-pending utility application Ser. No. 12/042,124, filed Mar. 4, 2008, which is incorporated by reference herein, for all purposes.

While FIG. 4 illustrates the digital comb limiter combiner 400 as a series of discrete elements, this is not meant as a limitation. The functions of two or more elements may be performed by a single element. By way of illustration and not as a limitation, the functions attributed to an A/D converter, a digital signal processor (DSP), and an D/A converter may be combined into a single component such as an ASIC chip. Other elements illustrated in FIG. 4 may be similarly combined.

Figure 5:
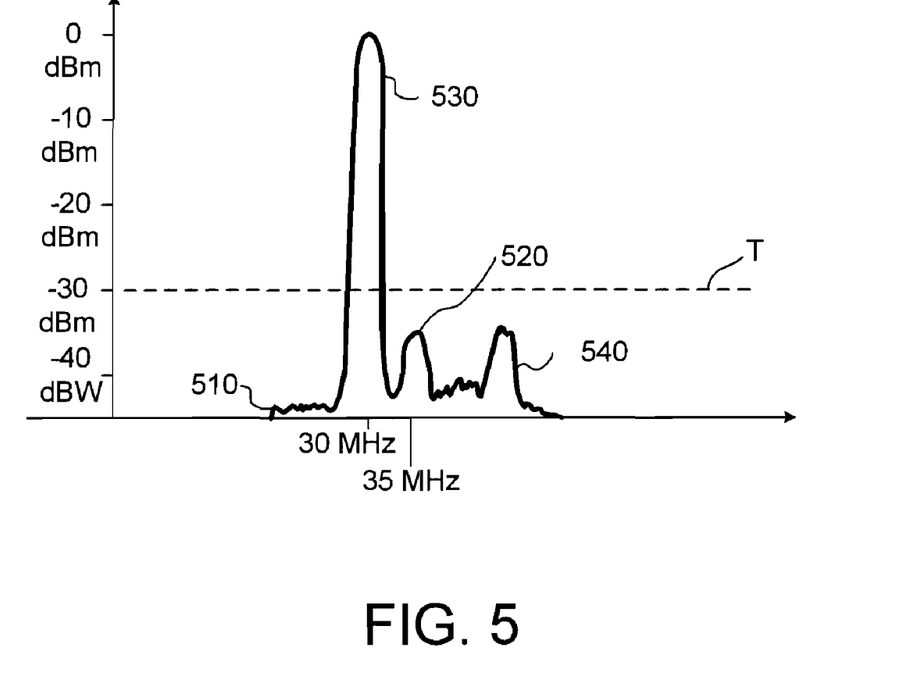
FIG. 5 illustrates a frequency domain representation of signals present in a CLIC sub-band prior to DSP frequency excision according to the embodiment of FIG. 4.

Referring to FIG. 5, a frequency domain representation illustrates signals present in a CLIC sub-band prior to frequency excision according to the embodiment of FIG. 4. The band limited noise floor 510 reflects that the signal has passed through one of the input bandpass filters 510. The SOI 520 has a small amplitude that is well below the threshold T and is dwarfed in size by the amplitude of an adjacent interfering signal 530. A second adjacent interfering signal 540 has an amplitude below the threshold T. The SOI 520 may be, for example, a threat signal to be processed for intelligence value. The interfering signals 530, 540 may be, for example, co-site interference produced by a transmitter whose antenna is co-located with the receiving antenna 402 (see FIG. 4), or as another example, a jamming signal produced by a hostile source. The interfering signal 530 exceeds the threshold T.

Figure 6:
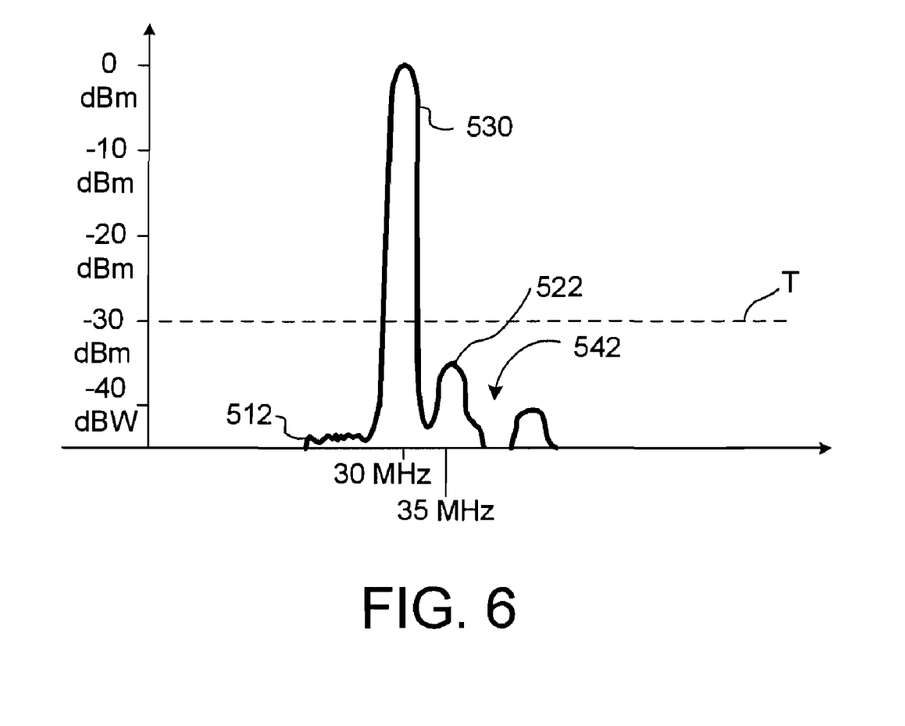
FIG. 6 illustrates a frequency domain representation of signals present in a CLIC sub-band after notch filter frequency excision according to the embodiment of FIG. 4.

Referring to FIG. 6, a frequency domain representation illustrates signals present in a CLIC sub-band after frequency excision by the notch filter according to the embodiment of FIG. 4. The smaller amplitude interfering signal 540 has been suppressed 542 by one of the bank 420 of notch filters. The SOI 522 remains substantially unscathed. The noise floor 512 remains substantially unchanged except for the addition of any Gaussian noise that is added as a result of passing the signal passes through the notch filter bank 420 (see FIG. 4). The notch filters 420 may be cryogenically cooled or operated at higher temperatures.

Figure 7:
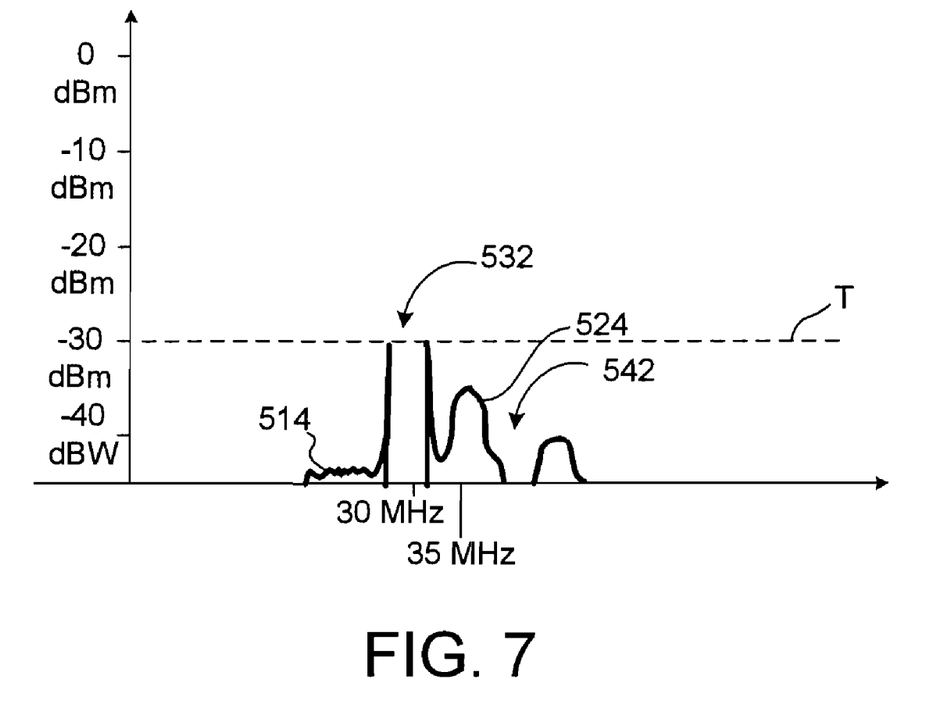
FIG. 7 illustrates a frequency domain representation of signals present in a CLIC sub-band after notch filter and DSP frequency excision according to the embodiment of FIG. 4.

Referring to FIG. 7, a frequency domain representation illustrates signals present in a CLIC sub-band after frequency excision by the DSP according to the embodiment of FIG. 4. The signals falling within the frequency range where amplitude exceeds the threshold T have been excised, leaving a blank spot 532 in the spectrum where the excised spectral signature had previously been. The SOI 522 remains substantially unscathed, with the exception of some small portion that may have coincided with the excised band of frequencies. The noise floor 514 remains substantially unchanged except for the addition of any Gaussian noise that is added as a result of passing the signal passes through the DSP circuitry and notch filter.

Figure 8:
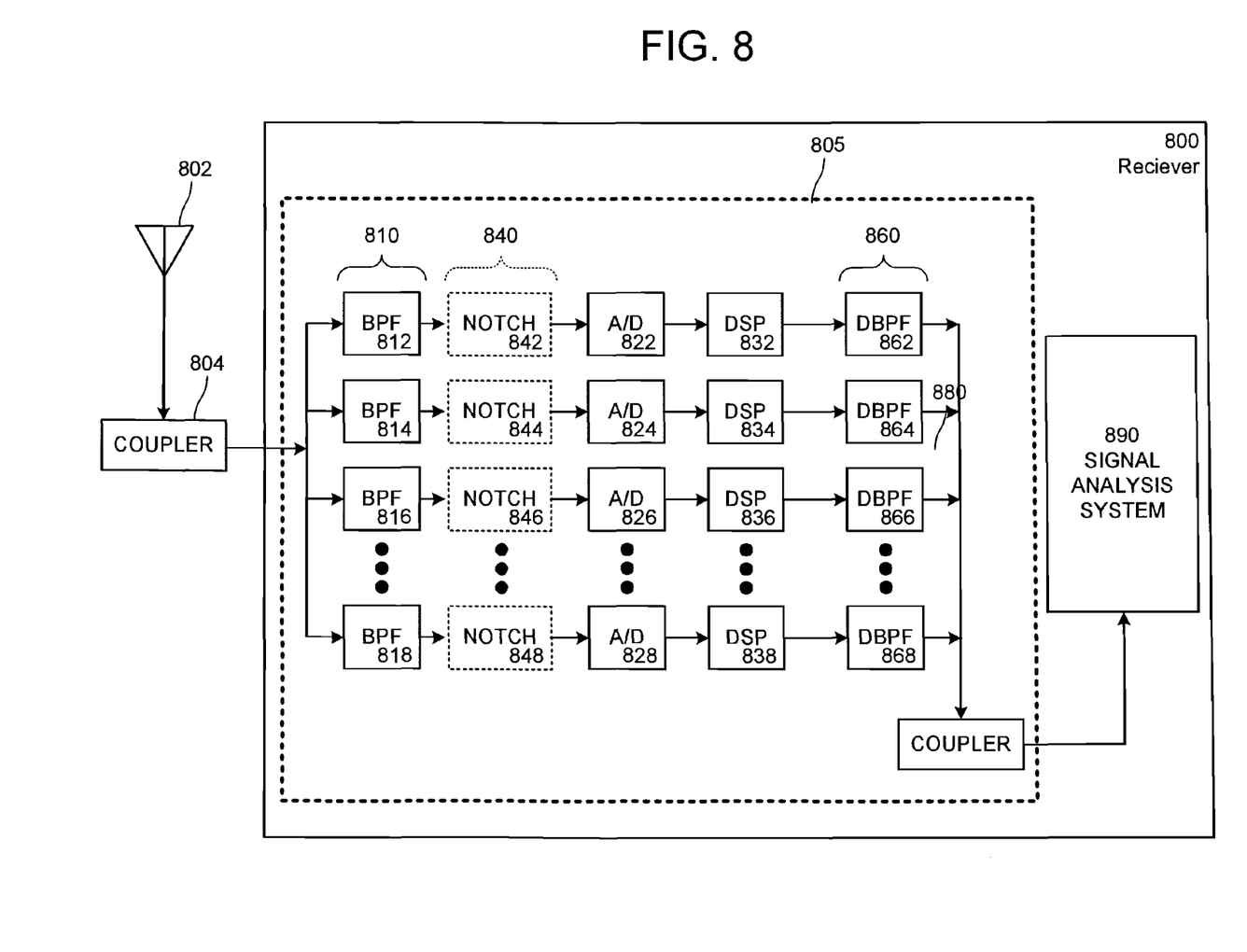
FIG. 8 illustrates a block diagram of a digital comb limiter combiner integrated with a receiver according to an embodiment.

FIG. 8 illustrates a CLIC that is integrated into a signal intelligence receiver according to an embodiment.

Receiver 800 comprises a front end 805 and a signal analysis system 890. Radio frequency signals are picked up by an antenna 802. The antenna 802 (for example, a communications signal antenna) is connected to an input signal coupler 804. The input signal coupler 804 (for example, a power splitter/combiner) distributes the antenna signal to the front end 805 of a receiver 800. The front end 805 of receiver 800 comprises parallel banks of input bandpass filters 810 (812, 814, 816, 818), analog to digital converters (822, 824, 826, 828), digital signal processors (822, 824, 826, 828), and digital output bandpass filters 860 (862, 864, 866, 868). The bank of digital output bandpass filters 860 is connected to output signal coupler 880. The output signal coupler 880 (for example, a linear power splitter/combiner) is connected to signal analysis system 890 of receiver 800. These elements of front end 805 operate as previously described.

Also illustrated in FIG. 8 is a bank of optional notch filters 840 (842, 844, 846, 848). The optional notch filters also operate as previously described.

The individual processed and filtered digital signals are combined to permit the signal analysis system 890 of the signal intelligence receiver 800 to analyze the broadband signal for intelligence data. Optionally, the individual processed and filtered digital signals may be sent to the signal analysis system 890 of the signal intelligence receiver 800 for evaluation.

It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the," is not to be construed as limiting the element to the singular.

What is claimed is:

1. A digital comb limiter combiner comprising:
   an antenna, wherein the antenna receives an analog signal;
   an input coupler connected to the antenna, wherein the input coupler receives the analog signal from the antenna;
   a plurality of sub-band signal processing paths connected to the input coupler, wherein each sub-band signal processing path receives the analog signal and wherein each sub-band processing path comprises:
      an input bandpass filter connected to the input coupler, wherein the input bandpass filter selects a sub-band of the analog signal;
      an analog to digital converter (A/D) connected to the input bandpass filter, wherein the A/D comprises instructions to convert the analog sub-band signal to a digital sub-band signal;
      a digital signal processor (DSP) connected to the A/D, wherein the DSP comprises:
         an excision threshold;
         instructions to convert the digital sub-band signal from a time domain to a frequency domain;
         instructions to excise signal components of the digital sub-band signal at frequencies at which a digital sub-band signal amplitude exceeds the excision threshold thereby producing a processed digital sub-band signal; and
         instructions to convert the processed digital sub-band signal from the frequency domain to the time domain;
      a digital to analog converter (D/A) connected to the DSP, wherein the D/A comprises instructions to convert the processed digital sub-band signal to a processed analog sub-band signal;
      an amplifier connected to the D/A; and
      an output bandpass filter connected to the amplifier to filter intermodulation products from the processed analog sub-band signal; and
   an output coupler connected to the output bandpass filter of each of the plurality of sub-band signal processing paths so as to receive the processed analog sub-band signal from each of the plurality of sub-band signal processing paths and to combine the processed analog sub-band signal from each of the plurality of sub-band signal processing paths into a composite signal.

2. The digital comb limiter combiner of claim 1, wherein the input bandpass filter is cryogenically cooled.

3. The digital comb limiter combiner of claim 1, wherein the output bandpass filter is cryogenically cooled.

4. The digital comb limiter combiner of claim 1, wherein the input bandpass filters of the plurality of sub-band signal processing paths have pass bands that are contiguous with one another across the entirety of a nominal bandwidth for the digital comb limiter combiner.

5. The digital comb limiter combiner of claim 1, wherein the input bandpass filter pass band and the output bandpass filter pass bands are substantially the same.

6. The digital comb limiter combiner of claim 1, wherein the excision threshold used by the DSP in a sub-band signal processing path is adjustable independent of an excision threshold used by a DSP in another sub-band signal processing path.

7. The digital comb limiter combiner of claim 1, wherein the DSP in a sub-band signal processing path transforms from the time domain into the frequency domain and from the frequency domain into the time domain independent of a DSP in another sub-band signal processing path.

8. The digital comb limiter combiner of claim 1, wherein a DSP in a sub-band signal processing path utilizes a sample size that is independent of a sample size used by a DSP in another sub-band signal processing path.

9. The digital comb limiter combiner of claim 1, wherein the gain used by the amplifier in a sub-band signal processing path is adjustable independent of a gain used by a DSP in another sub-band signal processing path.

10. A method for reducing electromagnetic interference in an analog signal received via an antenna with a digital comb limiter combiner comprising:
   coupling the analog signal from the antenna into a plurality of sub-band processing paths;
   in each sub-band processing path:
      selecting a sub-band of the analog signal;
      converting the analog sub-band signal to a digital sub-band signal;

transforming the digital sub-band signal from a time domain to a frequency domain;

excising signal components of the digital sub-band signal at frequencies that exceed the excision threshold to produce a processed digital sub-band signal;

converting the processed digital sub-band signal from the frequency domain to the time domain;

converting the processed digital sub-band signal to a processed analog sub-band signal; and filtering the processed analog sub-band signal to remove intermodulation products; and combining the processed analog sub-band signal from each of the plurality of sub-band signal processing paths into a composite signal.

11. The method of claim 10, wherein selecting a sub-band of the analog signal comprises passing the analog signal through a filter selected from the group consisting of a bandpass filter and a cryogenically cooled bandpass filter.

12. The method of claim 10, wherein filtering the processed analog sub-band signal to remove intermodulation products comprises passing the analog signal through a filter selected from the group consisting of a bandpass filter and a cryogenically cooled bandpass filter.

13. The method of claim 10, wherein input filters of the plurality of sub-band signal processing paths are bandpass filters and wherein the input bandpass filters have pass bands that are contiguous with one another across the entirety of a nominal bandwidth for the digital comb limiter combiner.

14. The method of claim 10, wherein selecting a sub-band of the analog signal is performed by an input bandpass filter and wherein filtering the processed analog sub-band signal to remove intermodulation products is performed by an output bandpass filter and where the input bandpass filter pass band and the output bandpass filter pass band are substantially the same.

15. The method of claim 10, wherein excising signal components of the digital sub-band signal at frequencies that exceed the excision threshold to produce a processed digital sub-band signal is performed by a DSP and wherein the excision threshold used by the DSP in a sub-band signal processing path is adjustable independent of an excision threshold used by a DSP in another sub-band signal processing path.

16. The method of claim 10, wherein transforming the digital sub-band signal from a time domain to a frequency domain and converting the processed digital sub-band signal from the frequency domain to the time domain is performed by a DSP and wherein the DSP in a sub-band signal processing path transforms from the time domain into the frequency domain and from the frequency domain into the time domain independent of a DSP in another sub-band signal processing path.

17. The method of claim 10, wherein transforming the digital sub-band signal from a time domain to a frequency domain and converting the processed digital sub-band signal from the frequency domain to the time domain is performed by a DSP and wherein a DSP in a sub-band signal processing path utilizes a sample size that is independent of a sample size used by a DSP in another sub-band signal processing path.

18. The method of claim 10 further comprising amplifying the processed analog sub-band signal prior to filtering the processed analog sub-band signal to remove intermodulation products.

19. A digital comb limiter combiner comprising:

an antenna, wherein the antenna receives an analog signal;

an input coupler connected to the antenna, wherein the input coupler receives the analog signal from the antenna;

a plurality of sub-band signal processing paths connected to the input coupler, wherein each sub-band signal processing path receives the analog signal and wherein each sub-band processing path comprises:

an input bandpass filter connected to the input coupler, wherein the input bandpass filter selects a sub-band of the analog signal and wherein the input bandpass filters of the plurality of sub-band signal process paths have pass bands that are contiguous with one another across the entirety of a nominal bandwidth for the digital comb limiter combiner;

an analog to digital converter (A/D) connected to the input bandpass filter, wherein the A/D comprises instructions to convert the analog sub-band signal to a digital sub-band signal;

a digital signal processor (DSP) connected to the A/D, wherein the DSP comprises:

an excision threshold;

instructions to convert the digital sub-band signal from a time domain to a frequency domain;

instructions to excise signal components of the digital sub-band signal at frequencies at which a digital sub-band signal amplitude exceeds the excision threshold thereby producing a processed digital sub-band signal; and instructions to convert the processed digital sub-band signal from the frequency domain to the time domain;

a digital to analog converter (D/A) connected to the DSP, wherein the D/A comprises instructions to convert the processed digital sub-band signal to a processed analog sub-band signal; and an output coupler connected to the D/A of each of the plurality of sub-band signal processing paths so as to receive the processed analog sub-band signal from each of the plurality of sub-band signal processing paths and to combine the processed analog sub-band signal from each of the plurality of sub-band signal processing paths into a composite signal.

20. The digital comb limiter combiner of claim 19, wherein the input bandpass filter is a cryogenically cooled high temperature bandpass filter.

21. The digital comb limiter combiner of claim 19, wherein each sub-band signal processing path further comprises an output bandpass filter interposed between the D/A and the output coupler so as to receive the processed analog sub-band signal from the D/A and provide a filtered signal to the output coupler and wherein the output bandpass filter has a pass band that is substantially matched to that of a corresponding one of the input bandpass filters.

22. The digital comb limiter combiner of claim 21, wherein the output bandpass filter is a cryogenically cooled bandpass filter.

23. The digital comb limiter combiner of claim 19, wherein the excision threshold used by the DSP in a sub-band signal processing path is adjustable independent of an excision threshold used by a DSP in another sub-band signal processing path.

24. The digital comb limiter combiner of claim 19, wherein the DSP in a sub-band signal processing path transforms from the time domain into the frequency domain and from the frequency domain into the time domain independent of a DSP in another sub-band signal processing path.

25. The digital comb limiter combiner of claim 19, wherein a DSP in a sub-band signal processing path utilizes a sample size that is independent of a sample size used by a DSP in another sub-band signal processing path.

26. A digital comb limiter combiner comprising:

an antenna, wherein the antenna receives an analog signal;

an input coupler connected to the antenna, wherein the input coupler receives the analog signal from the antenna;

a plurality of sub-band signal processing paths connected to the input coupler, wherein each sub-band signal processing path receives the analog signal and wherein each sub-band processing path comprises:

an input bandpass filter connected to the input coupler, wherein the input bandpass filter selects a sub-band of the analog signal;

a notch filter connected to the input bandpass filter;

an analog to digital converter (A/D) connected to the notch filter, wherein the A/D comprises instructions to convert the analog sub-band signal to a digital sub-band signal;

a digital signal processor (DSP) connected to the A/D, wherein the DSP comprises:

an excision threshold;

instructions to convert the digital sub-band signal from a time domain to a frequency domain;

instructions to excise signal components of the digital sub-band signal at frequencies at which a digital sub-band signal amplitude exceeds the excision threshold thereby producing a processed digital sub-band signal; and instructions to convert the processed digital sub-band signal from the frequency domain to the time domain;

a digital to analog converter (D/A) connected to the DSP, wherein the D/A comprises instructions to convert the processed digital sub-band signal to a processed analog sub-band signal;

an amplifier connected to the D/A; and an output bandpass filter connected to the amplifier to filter intermodulation products from the processed analog sub-band signal; and an output coupler connected to the output bandpass filter of each of the plurality of sub-band signal processing paths so as to receive the processed analog sub-band signal from each of the plurality of sub-band signal processing paths and to combine the processed analog sub-band signal from each of the plurality of sub-band signal processing paths into a composite signal.

27. The digital comb limiter combiner of claim 26, wherein the input bandpass filter is cryogenically cooled.

28. The digital comb limiter combiner of claim 26, wherein the output bandpass filter is cryogenically cooled.

29. The digital comb limiter combiner of claim 26, wherein the input bandpass filters of the plurality of sub-band signal processing paths have pass bands that are contiguous with one another across the entirety of a nominal bandwidth for the digital comb limiter combiner.

30. The digital comb limiter combiner of claim 26, wherein the input bandpass filter pass band and the output bandpass filter pass bands are substantially the same.

31. The digital comb limiter combiner of claim 26, wherein the excision threshold used by the DSP in a sub-band signal processing path is adjustable independent of an excision threshold used by a DSP in another sub-band signal processing path.

32. The digital comb limiter combiner of claim 26, wherein the DSP in a sub-band signal processing path transforms from the time domain into the frequency domain and from the frequency domain into the time domain independent of a DSP in another sub-band signal processing path.

33. The digital comb limiter combiner of claim 26, wherein a DSP in a sub-band signal processing path utilizes a sample size that is independent of a sample size used by a DSP in another sub-band signal processing path.

34. The digital comb limiter combiner of claim 26, wherein the gain used by the amplifier in a sub-band signal processing path is adjustable independent of a gain used by a DSP in another sub-band signal processing path.

35. The digital comb limiter combiner of claim 26, wherein the notch filter is self-tuning and wherein the self-tuning notch filter is tuned based upon a tune word provided by a co-site transmitter.

36. The digital comb limiter combiner of claim 26, wherein the notch filter comprises a cryogenically cooled high temperature superconductor notch filter.

* * * * *